United States Patent Office 3,553,290
Patented Jan. 5, 1971

3,553,290
SPANDEX FIBERS STABILIZED WITH CONDENSATES OF SUBSTITUTED PHENOLS AND DIVINYL BENZENES
Oliver Larry Hunt, Waynesboro, Va., assignor to E. I. du Pont de Nemours and Company, Wilmington, Del., a corporation of Delaware
No Drawing. Filed Apr. 10, 1968, Ser. No. 720,379
Int. Cl. C08g 41/04
U.S. Cl. 260—859          11 Claims

ABSTRACT OF THE DISCLOSURE

Resinous condensates of divinyl aromatic compounds and p-alkyl phenols with molecular weights in the range of 1500 to 4000 are incorporated into shaped articles of long-chain synthetic segmented polyurethanes such as spandex fibers to provide resistance to yellowing upon exposure to smog even after repeated dry-cleaning.

BACKGROUND OF THE INVENTION

Field of the invention

This invention relates to color-stabilized shaped articles prepared from polyurethane compositions. More particularly, the invention relates to spandex fibers which are resistant to yellowing upon exposure to atmospheric fumes.

Description of the prior art

It is known that spandex fibers upon exposure to atmospheric conditions are frequently subject to undesirable discoloration or yellowing of the fibers. The known tendency to discolor under certain atmospheric conditions is quite pronounced in the case of polyether-based spandex, particularly polyether-based spandex containing in the polymer chain recurring aromatic ureylene residues, i.e., radicals of the formula:

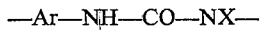

wherein X represents hydrogen or a monovalent organic radical and Ar represents an aromatic radical attached to the adjacent N of the formula through a carbon atom of an aromatic ring. Such spandex fibers yellow strongly under the action of the gaseous combustion products of hydrocarbon fuels. Although the discoloration may be offset to some extent by tinting or by the use of other masking agents, such materials often cause the fibers to display undesirable color characteristics, since they merely mask and do not inhibit the formation of the yellow color.

Phenolic compounds have been recommended, as in the Swart et al. Pat. U.S. 2,915,496 and the Schick Pat. Canadian 668,727, as antioxidants for polyether-based polyurethanes. A particularly effective phenol, 1,3,5-trimethyl - 2,4,6-tris(3,5-di-t-butyl - 4 - hydroxybenzyl)benzene, which also protects such spandex against yellowing caused by a smog atmosphere, is taught in the Smith Pat. British 1,059,605. Although these materials do indeed stabilize spandex, they are easily extracted from the fiber by the perchloroethylene used in commercial dry-cleaning solvents.

SUMMARY OF THE INVENTION

This invention provides color-stabilized shaped articles of polyether-based polyurethane compositions. In particular, the stabilized compositions are resistant to yellowing on exposure to a smog atmosphere and retain this resistance after repeated dry-cleaning operations.

The invention is a spandex fiber containing a stabilizing quantity of a resinous condensate of a divinyl aromatic compound and a phenol substituted in the para-position by an alkyl group having from one to two carbon atoms, said resinous condensate having a molecular weight in the range from about 1500 to about 4000.

DETAILED DESCRIPTION

The resinous condensates used as stabilizers in this invention are members of a known class of materials, the preparation of which is in general also known, for example in the Ohlmann et al. Pat. U.S. 2,665,312. However, the resinous condensates useful for this invention must be critically selected with respect to composition and molecular weight. Furthermore, special methods are required for the preparation of the stabilizers. These critical requirements are discussed below.

The phenols used in making the stabilizers are p-alkyl phenols. The alkyl substituent is either methyl or ethyl, methyl being preferred. Alkyl substituents higher than ethyl produce stabilizers that are too readily extractable by perchloroethylene.

The divinyl aromatic compounds used in making the stabilizers are divinyl benzene and substituted divinyl benzenes. This component must contain two vinyl groups, i.e., —CH=CH₂. Isopropenyl groups, i.e.,

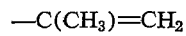

are not satisfactory. The two vinyl groups may be located on the benzene ring in either the meta- or para-positions but may not be ortho to each other. The divinyl benzene should be at least 90% pure. Ordinary commercial divinyl benzene is unsatisfactory for this invention, because only about 55% of the material is divinyl benzene (actually a mixture of divinyl benzenes), the remaining 45% comprising ethylvinylbenzenes, diethylbenzenes, and other ingredients. For this invention, up to about 7% ethylvinylbenzene can be tolerated as an impurity in the divinyl benzene. The divinyl benzene may be substituted on the ring with groups free of active hydrogen.

It is preferred that the resinous condensate be a linear polymer so that it will be soluble in the solution of spandex polymer to be stabilized. It is also preferred that there be no residual vinyl unsaturation in the stabilizer. Accordingly, the resinous condensate is preferably prepared so that the terminal groups are derived from the phenol. To this end, the condensation reaction is carried out with an excess of the phenol, the mole ratio of pure divinyl benzene/phenol being in the range from 0.84 to 0.97.

In general, preparation of the stabilizer is carried out under special conditions to ensure condensation only between the substituted phenol and the divinyl benzene. The condensation is carried out at a temperature less than 35° C. in order to avoid vinyl polymerization of the divinyl benzene, thereby avoiding formation of cross-linked polymer and minimizing the presence of unreacted hydrogen atoms ortho to phenolic hydroxyl in the condensate. A portion of the substituted phenol is added to the divinyl benzene without catalyst in order to stabilize the diolefin against homopolymerization. The usual Lewis acids are useful catalysts for the condensation reaction, boron trifluoride diethyl etherate being preferred. The condensation is conveniently carried out in toluene. The solution of product in toluene is washed with water to decompose catalyst, and suitable base is added to neutralize any acid residue. After being washed again with water, the toluene and water are removed from the product by distillation.

The molecular weight of the stabilizer must be in the range from about 1500 to about 4000 as determined by vapor pressure osmometry. The molecular weight of the stabilizer is regulated in known manner, essentially by the stoichiometry of the condensation reaction. With a molecular weight below 1500, an excessive amount of the stabilizer is lost by extraction in the dry-cleaning solvents. With a molecular weight above 4000, the stabilizer has poor solubility in the usual solvents for the spandex polymer. Preferably, the molecular weight of the stabilizer is in the range from 1700 to 3500.

The amount of resinous condensate used as stabilizer in this invention may vary within a wide range, amounts from a fraction of 1%, e.g., 0.2%, to about 5% or even 10% or more by weight based on the segmented polyurethane being effective. The optimum quantity for a particular fiber will vary and for reasons of economy should, of course, be kept as low as possible. The selection of the optimum quantity will depend on a number of factors such as the particular type of spandex fiber, the fiber geometry, and porosity. Preferably, amounts from about 0.3% to about 1.5% by weight are utilized.

The term "spandex fiber" is used in its generic sense herein to mean a manufactured fiber in which at least 85% of the fiber-forming substance is a long-chain, synthetic, segmented polyurethane. It is not intended, however, that the invention be limited to fibers of such segmented polyurethanes since the stabilization is achieved with other shaped articles, such as films and the like. The segmented polyurethane polymers which provide spandex fibers contain the occurring linkage

A substantial number of the urethane nitrogens may be joined to aromatic radicals, which, as indicated above, may be further attached to a ureylene linkage

wherein X is hydrogen or a monovalent organic radical such as methyl, ethyl or phenyl. Polyurethanes of this type containing ether linkages in the chain appear to be most susceptible to be discoloring action of a smog atmosphere. Generally speaking, these segmented polyurethanes are prepared from hydroxyl-terminated polyethers of low molecular weight. Reaction of the polyether with a stoichiometric excess of organic diisocyanate produces an isocyanate-terminated polymeric intermediate, which may then be chain-extended with a difunctional, active hydrogen-containing compound, such as water, hydrazine, organic diamines, glycols, dihydrazides, amino alcohols, etc.

Among the segmented polyurethanes of the spandex type are those described in several patents among which are U.S. Patents 2,929,801, 2,929,802, 2,929,803, 2,929,804, 2,953,839, 2,957,852, 2,999,839, 3,040,003, and 3,071,557. As described in the aforementioned patents, the segmented polyurethane elastomers are comprised of amorphous segments derived from polymers having a melting point below about 50° C. and a molecular weight above about 600, and contain from about 5% to 40% of crystalline segments derived from a polymer having a melting point above about 200° C. in the fiber-forming molecular weight range. Most of such polyurethanes, when in filament form, have elongations greater than 150%, tensile recovery of over 90%, and a stress decay of less than 20%, as defined in U.S. 2,957,852. The disclosures of the above patents are incorporated herein by reference.

The polyether glycol from which the "soft segment" is derived may contain a single type of linkage, such as in the poly(alkylene oxide) glycols, or it may have more than one type of linkage, as in the polyoxathiaalkylene glycols and in the polyetherester glycols. Even where the linkages are the same, the composition may be a copolymer, such as a copolyether prepared from a mixture of glycols. The polyether glycols may be substituted with halogen, alkyl, and similar groups, which do not interfere with the subsequent polymerization reactions. Representative polyethers which may be used include the poly(alkylene oxide) glycols, such as polyethylene glycol, polypropylene glycol, and polytetramethylene ether glycol, and the polyacetals, such as polydioxolane and polymers from the reaction of formaldehyde with hexamethylene glycol. For the purposes of this invention, the preferred polyether glycols include polytetramethylene ether glycol and glycols of polytetramethylene ether having urethane and/or ester groups in the polymer chain.

Polyesters may be used with the polyethers either as an added component or as an integral part of the polyether molecule, thus forming a polyetherester. Examples of such polyetheresters are poly(diethylene glycol adipate) and poly(triethylene glycol adipate). In general, the term "polyether" as used herein includes mixtures and/or copolymers containing at least 15 mol percent of polyether. Thus, the term includes etherester copolymers from an ether-containing glycol, as noted above, as well as a copolymer prepared from a mixture of an ether-containing glycol and a non-ether-containing glycol such that at least 15% of the non-carbon atoms in the polymer chain are ether-oxygen atoms. Also, the term includes mixtures of polyethers with other suitable soft segments, for example, a mixture of polyether glycol and polyester glycol containing at least 15 mol percent of polyether glycol.

The hydroxyl-terminated soft segment is generally reacted with an organic diisocyanate as indicated hereinabove. Suitable aromatic diisocyanates include p-phenylene diisocyanate, 4,4'-biphenylene diisocyanate, p,p'-methylenediphenyl diisocyanate, and p,p'-isopropylidenediphenyl diisocyanate. Aliphatic and cycloaliphatic diisocyanates, for example, 4,4'-methylenedicyclohexyl diisocyanate, are also suitable. The diisocyanates may contain other substituents, although those which are free from reactive groups other than the two isocyanate groups, are ordinarily preferred. The organic diisocyanate is not critical for this invention, and any of those disclosed in the prior art pertaining to spandex may be used.

The difunctional, active hydrogen-containing compounds suitable as chain-extenders include a wide variety of compounds as indicated hereinabove. Organic diamines are preferred. Suitable diamines include ethylenediamine, N,N' - dimethyl-ethylenediamine, tetramethylenediamine, 1,2 - propylenediamine, m - xylenediamine, p-xylylenediamine, cyclohexylenediamine, piperazine and many others. Symmetrical aliphatic diamines are preferred, but aromatic diamines, e.g., p-phenylenediamine and p.p'-methylenedianiline, may be used. If the diisocyanate is non-aromatic, the use of an aromatic chain-extender provides the aromatic ureylene linkage in the spandex polymers to which this invention is particularly pertinent.

Although the stabilizer may be incorporated in the shaped article by various procedures, preferably it is dissolved in a solution of the segmented polyurethane prior to shaping. In this method, the polyurethane should be substantially free of unreacted isocyanate groups. The solution may then be cast into a film in the conventional way. Solutions of the spandex polymer containing the stabilizer may also be spun into fibers by the usual extrusion techniques, e.g., dry spinning.

Other methods for incorporating the stabilizer are similar to those used for incorporating dyestuffs. For example, the stabilizer may be dissolved in a suitable solvent to which the fibers are inert, i.e., non-reactive, and the fibers immersed in the treating solution. Or the stabilizer may be dispersed in a liquid medium and applied to the fiber by passing it through a treating bath containing the dispersed stabilizer. Alternatively, the stabilizer of this invention may be incorporated in the spin finish and applied to the fiber immediately after extrusion.

The spandex fibers may be treated alone or may be incorporated in fabrics with fibers of different compositions. While the treatment of fabrics containing other fibers as well as spandex fibers requires more of the treating agent, the other fibers are not adversely affected. Both natural and synthetic fibers, as well as blends thereof, may be included in the fabrics without impairing the stabilization of the spandex fibers. However, the preferred method of stabilizing the spandex is to incorporate the stabilizer in the spinning solution before extrusion.

This invention is also applicable to shaped articles other than fibers and films prepared, e.g., by molding, from segmented polyurethanes as hereinbefore defined. Additives, fillers, plasticizers, pigments, and the like, which are conventionally used with segmented polyurethanes, may be used as desired with the stabilizers of this invention.

The principal advantage attained by the present invention resides in providing spandex fibers which are stabilized against yellowing due to a smog atmosphere. In addition to the color stability, a further advantage is the protection of the stabilized fibers against loss of physical properties under conditions of high temperature or on exposure to ultraviolet light.

This invention will be further illustrated, but is not intended to be limited, by the following examples in which parts and percentages are by weight unless otherwise specified.

In the examples, the test for smog discoloration is performed by exposing fiber or film samples to atmospheric pollutants generated in a laboratory test chamber. Samples of film or continuous-filament spandex wrapped on a metal frame are exposed to a synthetic atmosphere generated from a gaseous mixture of 4 p.p.m. nitrogen dioxide, 2 p.p.m. sulfur dioxide and 8 p.p.m. 2-pentene in air by irradiating with 8 "Black" fluorescent tubes (GE Type F30P8BL). A detailed description of the procedure used and the Scott Controlled Atmospheric Tester used appears in the Du Pont Technical Information Bulletin L–33 from the Textile Fibers Department, Technical Service Section, E. I. du Pont de Nemours & Co., Wilmington, Del.

This synthetic atmosphere has been found to simulate a "photochemical smog," thereby providing an accelerated discoloration test for reproducibly discoloring spandex yarn. It has been found that the color development obtained on exposure of samples in the laboratory test for twelve hours correlates well with a six-week exposure of elastic fabrics in Los Angeles, Calif., an area well known for smog problems.

The degree of yellowness, referred to in the examples as $b$ value, is determined from colorimetric data obtained by analyzing continuous filament samples in aggregates which are about three inches square. The reflectance ratios of the samples in the green and blue filter settings of a colorimeter are measured, using a Model IV Color Master Differential Colorimeter, manufactured by Manufacturers Engineering and Equipment Corporation, Hatboro, Pa., and calibrated against the manufacturer's standard reference plates and the National Bureau of Standards' certified reflectance plates. Three readings are taken on each of the samples, with those for the filament samples aligned so that the long axis of the filament is parallel to the long axis of the instrument. The $b$ values are then calculated from the average of three readings, using the following formula:

$$b = 42.34(G^{1/2} - B^{1/2})$$

where G represents the reflectance ratio with the green filter and B represents the reflectance ratio with the blue filter.

EXAMPLE 1

To a 3-necked flask equipped with stirrer, dropping funnel, nitrogen inlet, condenser and thermometer are added 237 parts of p-cresol and 400 parts of toluene. In the dropping funnel is placed a mixture of 315 parts of divinyl benzene (98% pure) containing 70/30 para/meta isomers, 26 parts of p-cresol and 300 parts of toluene. The stirrer is started and about 18 parts of the mixture in the dropping funnel is added to the flask. Through the condenser 6 parts of boron trifluoride diethyl etherate is added. The remaining mixture in the dropping funnel is added slowly over a period of 2 hours. The flask is cooled as necessary to maintain the temperature below 35° C. during this period and for an additional 16 hours or until the ratio of the heights of the 11.6µ peak to the 12.5µ peak of the infrared spectrum of the flask contents reaches a maximum. The contents of the flask are then neutralized with a dilute aqueous solution of sodium carbonate and the toluene layer separated and washed with distilled water. The toluene layer is then diluted with about 600 parts of dimethylacetamide and the toluene and any residual water removed under vacuum.

For the determination of the molecular weight, a sample is heated to 220° C. to strip off the dimethylacetamide while stirring under nitrogen. After the temperature reaches at least 210° C. a vacuum of about 15 mm. mercury is applied. The molecular weight is 3500 as determined in toluene on a Model 301A Vapor Pressure Osmometer from Mechrolab Inc., 1062 Linda Vista Avenue, Mountain View, Calif. according to the procedure of A. P. Brady, H. Huff, and J. W. McBain, Journal of Physical and Colloid Chemistry, 55, 304 (1951). Visual melting point (sample heated 4° C. per minute) is 133–153° C. Melting point by differential thermal analysis is 106° C.

EXAMPLES 2–5

Resinous condensates of different molecular weights are prepared as described in Example 1 by varying the molar ratio of divinyl benzene to p-cresol. Other deviations from Example 1 and the product molecular weights are summarized in the following table:

TABULATION OF REACTION VARIABLES

| Example | Mole ratio | Neutralizing agent | Time required for DVB addition | Parts DMAc* | M.W. |
|---|---|---|---|---|---|
| 2 | 0.95 | Na₂CO₃ | 16 hours | 600 | 2,460 |
| 3 | 0.93 | Diethylamine | 1 hr. 20 min | 15 | 2,180 |
| 4 | 0.88 | do | do | | 1,730 |
| 5 | 0.84 | do | do | | 1,490 |

* Added prior to removal of low boilers.

In the above tabulation, DVB stands for divinyl benzene and DMAc stands for dimethylacetamide.

EXAMPLE 6

A solution of spandex polymer in dimethylacetamide is prepared as described. Into a mixer maintained at 50° C. are fed a stream of polytetramethylene ether glycol at a rate of 8 pounds per hour and a stream of liquid p,p'-methylenediphenyl diisocyanate at 2 pounds per hour. The polytetramethylene ether glycol has a molecular weight of about 2000 and is thoroughly pre-dried by treatment with a molecular sieve. The reagents are intimately mixed, remain in the mixer for one minute, and are discharged continuously into a jacketed pipeline maintained at about 96° C. and extending for 25 feet. The pipeline serves as a reactor in which the polyether glycol is "capped" with 2 mols of the diisocyanate to yield an isocyanate-terminated polyether. The average time spent in the reactor is between 90 and 100 minutes. On emerging from the pipeline reactor, the isocyanate-terminated polyether is cooled at once to below 45° C. The cooled isocyanate-terminated polyether is conducted at a rate of 9.2 pounds per hour into a high-shear mixer containing a rotating disc, and a stream of N,N-dimethylacetamide is added at 6.8 pounds per hour. The mixture (57.5% solids) is thoroughly agitated for 15 minutes and then passes to a chamber in which a mixture of hydrazine (35% in water) and diethylamine (5% in dimethylacetamide), in the ratio of 4.2 parts of hydrazine to 1 part of diethylamine, together with additional dimethylacetamide is added as a single stream at a rate of 16.5 pounds per hour with strong agitation. The mixture passes to a reaction chamber held at a temperature of 20° to 70° C., the contents having a residence time of about 2–3 minutes. The emerging polymer solution contains approximately 30.0% solids and has a viscosity of 1400 poises at 30° C. The polymer has an intrinsic viscosity of 1.2.

To separate portions of this solution are added the resinous condensate from Example 1 hereinabove and "Santowhite" powder, i.e., 4,4'-butylidenebis-(6-t-butyl-m-cresol), such that the mixtures contain 1.0% of the respective additive based on the polymeric solids. Films approximately 4 mils thick are cast from these mixtures and from the spandex solution containing no additive on sheets of polyethylene terephthalate film (Du Pont's Mylar®). After thorough drying, the films are measured for $b$ value according to the procedure described above. The films on Mylar® are then exposed for 9 hours in the smog discoloration test described above and after exposure, the films are again measured for $b$ value. Results are as follows:

| Additive | "b" values | | |
|---|---|---|---|
| | As prepared | After exposure | $\Delta b$ |
| None | 1.9 | 30.9 | 29.0 |
| Resinous condensate | 2.0 | 14.8 | 12.8 |
| "Santowhite" powder | 2.4 | 28.8 | 26.4 |

EXAMPLE 7

A solution of spandex polymer in dimethylacetamide is prepared as described. Polytetramethylene ether glycol having a molecular weight of about 2000 (3080 parts) is mixed with 750 parts of p,p'-methylenediphenyl diisocyanate and heated at 80° C. for one hour to produce an isocyanate-terminate macrointermediate which contains 3.30% NCO. This product is then dissolved in 2570 parts of dry N,N-dimethylacetamide and 1525 parts of the resulting mixture is added with stirring to a solution of 48 parts of m-xylylenediamine and 1.6 parts of diethylamine in 2550 parts of dimethylacetamide at ambient temperature. A viscous solution of segmented copolymer is obtained which contains 24% solids and has a viscosity of 1200 poises. The segmented copolymer has an inherent viscosity of 1.26. To the polymer solution are added a slurry of titanium dioxide in dimethylacetamide and a solution of the resinous condensate prepared as described in Example 2 hereinabove, a copolymer of diisopropylaminoethyl methacrylate and decyl methacrylate (in a 70/30 weight ratio of the respective monomers), and ultramarine blue pigment in dimethylacetamide such that the final mixture contains 5%, 1.25%, 5%, and 125 parts per million of each additive, respectively, based on the spandex polymer. The mixture is dry-spun in the conventional manner to yield a coalesced multifilament spandex yarn of 40 denier. The yarn has a $b$ value of −2.1. After exposure for 16 hours in the smog discoloration test described above, the $b$ value is 4.7.

EXAMPLE 8

A solution of spandex polymer in dimethylacetamide is prepared as described. Into a mixer maintained at about 50° C. are fed a stream of polytetramethylene ether glycol, which has been thoroughly predried by treatment with a molecular sieve and which has molecular weight of 1540 and a stream of liquid p,p'-methylenediphenyl diisocyanate in the molar ratio of 1.60. The reagents are intimately mixed for about one minute and are discharged continuously into a jacketed pipeline maintained at a temperature of 75° to 95° C. In the pipeline (average residence time of 90 to 100 minutes) the reagents combine to form an isocyanate-terminate polyether. The isocyanate-terminated polyether is led to a high-shear mixer containing a rotating disc, and a stream of N,N-dimethylacetamide is added to give a mixture containing about 45% solids. The mixture is thoroughly agitated for about 5 minutes and then passes to a chamber in which chain-extending diamine comprising ethylenediamine and 1,3-cyclohexylenediamine in an 80/20 mole ratio and diethylamine (in the ratio of about 12 to 16 mols of diamine per mol of diethylamine) together with additional dimethylacetamide are added as a single stream with strong agitation. The mixture passes to a reaction chamber in which it is held for about 2 to 3 minutes at a temperature of 20° C. to 100° C. The additives listed in Example 7 above are incorporated in the polymer solution and the mixture is dry-spun as in Example 7. The resulting yarn has a $b$ value of −2.1. After exposure for 16 hours in the smog discoloration test, the $b$ value is 5.3.

EXAMPLE 9

A mixture of 205 parts of polytetramethylene ether glycol having an average molecular weight of 2050 and 52.4 parts of 4,4'-methylenedicyclohexyl diisocyanate containing 20% of the trans-trans isomer is heated with stirring under nitrogen to 47–50° C. Upon addition of 0.006 part of dibutyltin dilaurate to the heated, stirred mixture there results an exothermic reaction in which the temperature increases to about 70–75° C. The temperature is maintained for 60 minutes. The isocyanate-terminated polyether so obtained contains 3.13% NCO. A solution is formed by dissolving 35 parts of the isocyanate-terminated polyether in 87.2 parts of dry dimethylacetamide. To this solution is added with stirring at ambient temperature a sufficient amount of a solution of 1.45 parts of 1,3-cyclohexylenediamine containing 65% of the cis isomer) and 0.077 part of cyclohexylamine in 11.3 parts of dry dimethylacetamide until the mixture remains permanently basic to Malachite Green indicator. The spandex polymer so produced has an inherent viscosity of about 1.25.

To the viscous solution of spandex polymer containing 27% solids is added a slurry of titanium dioxide in dimethylacetamide and a solution in dimethylacetamide of the resinous condensate prepared as described in Example 2 hereinabove together with a polyurethane obtained by the reaction of 4,4'-methylenedicyclohexyl diisocyanate and N-t-butyl-diethanolamine, such that the final mixture contains 4.7%, 1.2%, and 2.0% of each additive, respectively, based on spandex polymer. The mixture so obtained is dry-spun in the usual way to produce a coalesced multifilament spandex yarn of 70 denier. The as-spun yarn has a $b$ value of 0.7. The yarn is exposed for 4 hours to the smog discoloration test as described hereinabove except that the synthetic smog was generated from a gaseous mixture of 12 p.p.m. nitrogen dioxide, 4 p.p.m. sulfur dioxide, and 40 p.p.m. 2-pentene in air by irradiation with 12 "Daylight" fluorescent tubes (GE F30P8D) and 4 "Black" fluorescent tubes (GE F30P8BL). The $b$ value after such exposure is 5.5.

A sample of spandex yarn is prepared as above except that 1.5% of a polyurethane from hexamethylene diisocyanate and 4-t-butyl-4-aza-2,6-heptanediol is used in place of the polyurethane from 4,4'-methylenedicyclohexyl diisocyanate and N-t-butyl-diethanolamine. The as-spun yarn has a $b$ value of 0.4. After exposure for 4 hours to the smog discoloration test described in the preceding paragraph, the $b$ value is 7.5.

EXAMPLE 10

A solution of spandex polymer in dimethylacetamide is prepared as described in Example 8 from polytetramethylene ether glycol, p,p'-methylenediphenyl diisocyanate, ethylenediamine, and 1,3-cyclohexylenediamine. Resinous condensates from Examples 1, 3, 4, and 5 above are dissolved in separate portions of the spandex polymer solution. In addition, there are prepared both a control sample containing no resinous condensate and a sample containing a resinous condensate selected from closely related prior art. The prior art sample is prepared according to Example 3 of Ohlmann et al., U.S. Pat. 2,665,312 by condensing a mixture of about 85 weight percent divinyl benzene and about 15 weight percent ethylvinylbenzene with an equimolar quantity of p-cresol, and is found to have a molecular weight of 680 by vapor pressure osmometry.

The control sample and the solutions containing 0.75% by weight of each resinous condensate based on the spandex polymer present are cast on Mylar® polyester sheets and dried for 4 hours at 50° C. Films having a thickness of approximately 4 mils are stripped from the Mylar® sheets. A one-gram sample of each film is treated with 150 ml. of perchloroethylene for 20 minutes at 24° C. The films are dried, measured for $b$ value, exposed for 12 hours to the smog discoloration test first described hereinabove, and again measured for $b$ value. Results are as follows:

| Molecular weight of resinous condensate | "b" values | | |
|---|---|---|---|
| | As prepared | After exposure | $\Delta b$ |
| 3,500 | −0.1 | 6.0 | 6.1 |
| 2,180 | −0.2 | 7.6 | 7.8 |
| 1,730 | −0.6 | 7.1 | 7.7 |
| 1,490 | −0.8 | 7.5 | 8.3 |
| 680 | 0.1 | 14.5 | 14.4 |
| Control | −0.6 | 21.5 | 22.1 |

What is claimed is:

1. A color-stabilized polyether-based spandex fiber containing about 0.2% to about 10% by weight based on the segmented polyurethane of a resinous condensate of a meta- or para-divinyl aromatic compound selected from the group consisting of divinyl benzene and substituted divinyl benzenes and a phenol substituted in the para-position by a methyl or ethyl group, said resinous condensate having a molecular weight in the range from about 1500 to about 4000.

2. Fiber of claim 1 in which the resinous condensate is a substantially linear polymer substantially free of residual vinyl unsaturation.

3. Fiber of claim 2 in which the divinyl aromatic compound is divinyl benzene.

4. Fiber of claim 3 in which the phenol is p-cresol.

5. Fiber of claim 4 wherein the quantity of resinous condensate is between about 0.3% and about 1.5% by weight based on the segmented polyurethane.

6. Fiber of claim 2 wherein the molecular weight of the resinous condensate is in the range from about 1700 to about 3500.

7. Fiber of claim 5 wherein the molecular weight of the resinous condensate is in the range from about 1700 to about 3500.

8. A color-stabilized shaped article comprising a long-chain, synthetic segmented polyurethane containing about 0.2% to about 10% by weight based on the segmented polyurethane of a resinous condensate of a meta- or para-divinyl aromatic compound selected from the group consisting of divinyl benzene and substituted divinyl benzenes and a phenol substituted in the para-position by a methyl or ethyl group, said resinous condensate having a molecular weight in the range from about 1500 to about 4000 and being substantially linear and substantially free of vinyl unsaturation.

9. Article of claim 8 in which the divinyl aromatic compound is divinyl benzene.

10. Article of claim 9 wherein the phenol is p-cresol.

11. Article of claim 10 wherein the molecular weight of the resinous condensate is in the range from about 1700 to about 3500.

References Cited

UNITED STATES PATENTS

| 2,224,837 | 10/1940 | Rosenthal | 260—62 |
| 2,665,312 | 1/1954 | Ohlmann | 260—62 |
| 2,865,887 | 12/1958 | Mackenzie | 260—62 |
| 3,177,166 | 4/1965 | Gregory | 260—5 |

FOREIGN PATENTS

| 1,005,877 | 9/1965 | Great Britain | 260—859 |

PAUL LIEBERMAN, Primary Examiner

U.S. Cl. X.R.

260—37, 41.5, 45.7, 45.95, 62, 67, 75, 77.5